(12) United States Patent
Desai et al.

(10) Patent No.: US 9,020,133 B2
(45) Date of Patent: Apr. 28, 2015

(54) CALL OCCUPANCY MANAGEMENT

(71) Applicant: Verizon Patent and Licensing Inc., Basking Ridge, NJ (US)

(72) Inventors: Prashant B. Desai, Land O Lakes, FL (US); Mayuresh Mohan Hegde, Irving, TX (US); Shawn J. Hadley, Keller, TX (US); Parind S. Poi, Lewisville, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 52 days.

(21) Appl. No.: 13/713,577

(22) Filed: Dec. 13, 2012

(65) Prior Publication Data

US 2014/0169549 A1   Jun. 19, 2014

(51) Int. Cl.
*H04M 3/00* (2006.01)
*H04M 5/00* (2006.01)
*H04M 3/523* (2006.01)
*G06Q 10/00* (2012.01)

(52) U.S. Cl.
CPC ............. *H04M 3/5238* (2013.01); *G06Q 10/00* (2013.01)

(58) Field of Classification Search
CPC ..... H04M 3/5175; H04M 3/523; H04M 3/51; H04M 3/5232; H04M 3/5233
USPC .............. 379/265.02, 265.03, 265.05, 266.01
See application file for complete search history.

(56) References Cited

U.S. PATENT DOCUMENTS

| 7,103,562 | B2 * | 9/2006 | Kosiba et al. ................ 705/7.38 |
| 7,174,010 | B2 * | 2/2007 | McIlwaine et al. ...... 379/265.01 |
| 8,488,769 | B1 * | 7/2013 | Noble et al. ............. 379/265.02 |
| 2002/0114442 | A1 * | 8/2002 | Lieberman et al. ...... 379/266.06 |
| 2007/0198325 | A1 * | 8/2007 | Lyerly et al. .................... 705/10 |

* cited by examiner

*Primary Examiner* — Nafiz E Hoque (57) ABSTRACT

A device may receive a history of call volumes and statistics for a call queue. The device may also receive, for each of a number of agents that are associated with the call queue, a work schedule. The device may determine a projected call occupancy for the call queue based on the history of call volumes for the call queue and the work schedules; select a subset of agents, among the number of agents that are associated with the call queue, that are not needed to handle calls in the call queue during a time for which projected call occupancy is below a first threshold; and assign tasks, for the time, to the subset of agents.

20 Claims, 7 Drawing Sheets

| GROUP | CALL VOLUME |
|---|---|
| NETWORK | S:8-10:4  10-12:2  12-2:2  2-4:1  4-6:2  6-8:0  8-10:2<br>M:8-10:22  10-12:25  12-2:28  2-4:30  4-6:32  6-8:20  8-10:15<br>T:8-10:20  10-12:23  12-2:26  2-4:31  4-6:29  6-8:23  8-10:17<br>W:8-10:15  10-12:15  12-2:21  2-4:33  4-6:32  6-8:21  8-10:19<br>TH:8-10:12  10-12:14  12-2:20  2-4:27  4-6:28  6-8:20  8-10:12<br>F:8-10:14  10-12:17  12-2:23  2-4:24  4-6:30  6-8:14  8-10:4<br>SA:8-10:8  10-12:14  12-2:10  2-4:0  4-6:2  6-8:20  8-10:15 |

412  414

420

| AGENT | SCHEDULE |
|---|---|
| JOHN SMITH | SU: 9-12, 13-18<br>M: 14-17, 19-24<br>T: 9-12, 13-18<br>TH: 7-11, 12-16<br>F: 8-12, 13-17 |

422  424

430

| GROUP | OCCUPANCY |
|---|---|
| NETWORK | S:8-10:0.1  10-12:0.05  12-2:0.05  2-4:0.025  4-6:0.5  6-8:0  8-10:0.05<br>M:8-10:0.55  10-12:0.63  12-2:0.7  2-4:0.75  4-6:0.8  6-8:0.5  8-10:0.38<br>T:8-10:0.5  10-12:0.58  12-2:0.65  2-4:0.78  4-6:0.73  6-8:0.575  8-10:0.43<br>W:8-10:0.38  10-12:0.38  12-2:0.53  2-4:0.41  4-6:0.8  6-8:0.53  8-10:0.48<br>TH:8-10:0.3  10-12:0.35  12-2:0.5  2-4:0.68  4-6:0.7  6-8:0.5  8-10:0.3<br>F:8-10:0.35  10-12:0.43  12-2:0.58  2-4:0.6  4-6:0.75  6-8:0.35  8-10:0.1<br>SA:8-10:0.2  10-12:0.35  12-2:0.25  2-4:0  4-6:0.05  6-8:0.5  8-10:0.38 |

CALL OCCUPANCY MANAGEMENT

BACKGROUND

When a user calls a contact center, the user may use dual tone multi-frequency (DTMF) tones to perform various functions, such as navigating through a menu tree to receive a service, purchasing a product, accessing information, and/or connecting to one of multiple agents attending to the contact center. More advanced contact centers may communicate with a user via instant messaging and/or rely on speech recognition subsystems in place of, or in addition to, DTMF signaling to provide similar functionalities.

DETAILED DESCRIPTION

The following detailed description refers to the accompanying drawings. The same reference numbers in different drawings may identify the same or similar elements. As used herein, the term "call" may refer not only to a plain old telephone system (POTS) phone call, but also to other forms of communication session between a calling party and a called party, such as a video communication session, texting session, Voice-over-Internet Protocol (VoIP) session, etc. In addition, the terms "contact center agents," "call center agents," "call agents," and "contact agents" may be used interchangeably.

Today's contact centers may include VoIP/Session Initiation Protocol (SIP) systems. Using a VoIP/SIP system allows contact centers to assemble virtual agent groups that can handle a large volume of calls. However, an incoming call traffic volume typically varies with peaks and valleys throughout the day, throughout the week, etc. Such patterns reveal "low call occupancy" periods for the agent groups. A low call occupancy period is a time during which an agent group receives a low number of calls relative to the number of contact agents available to handle calls. As part of an overhead associated with operating a contact center, low call occupancies can be exacerbated by the use of a forecasting tool for staffing. Forecasting tools generally add a safety margin to account for possible abnormal influx of calls.

Contact centers sometimes implement processes designed to take advantage of low call occupancy periods. Typically, these processes are manual and painstaking to perform. The processes may involve identification of idle contact agents in an agent group with a low call occupancy during times of low call volume. Thereafter, from the pool of such agents, contact center managers may randomly select agents and assign them to productive tasks (e.g., online training, customer follow ups, etc.). Such manual processes tend to be lengthy and inefficient, may lead to mistakes and missed opportunities, and may be unable to improve the key performance indicator (KPI) for the contact center. The KPI provides a measure of the efficiency of the contact center.

As described below in detail, a call occupancy management system may apply business rules, which control the behavior of a productivity engine, to information/data that the productivity engine receives from a historical call database, a work force management application, and an automatic call distributor.

From the historical call database, the productivity engine receives past call arrival rates, call distribution patterns, average call handling times, average response times, etc. From the work force management application, the productivity engine receives agent schedules. From the automatic call distributor, the productivity engine receives real time feeds and events that describe the current contact center conditions (e.g., number of calls waiting in different queues, oldest call waiting time, the number of agents logged in at a queue, etc.).

Based on the received information, the productivity engine identifies agent groups with low call occupancy or projected low call occupancy. Thereafter, the tasks are pushed to the agents via task adaptors that handle the specifics of each task. The task adaptors also monitor and control the completion of each task.

Because the productivity engine monitors incoming calls in real time, the productivity engine is capable of responding to sudden influx of calls, by releasing agents from, for example, training and notifying them to be online and/or return to answering calls. This allows the contact center that includes the call occupancy management system to respond to the customers in a timely manner, without affecting the contact center KPI.

Figure 1:
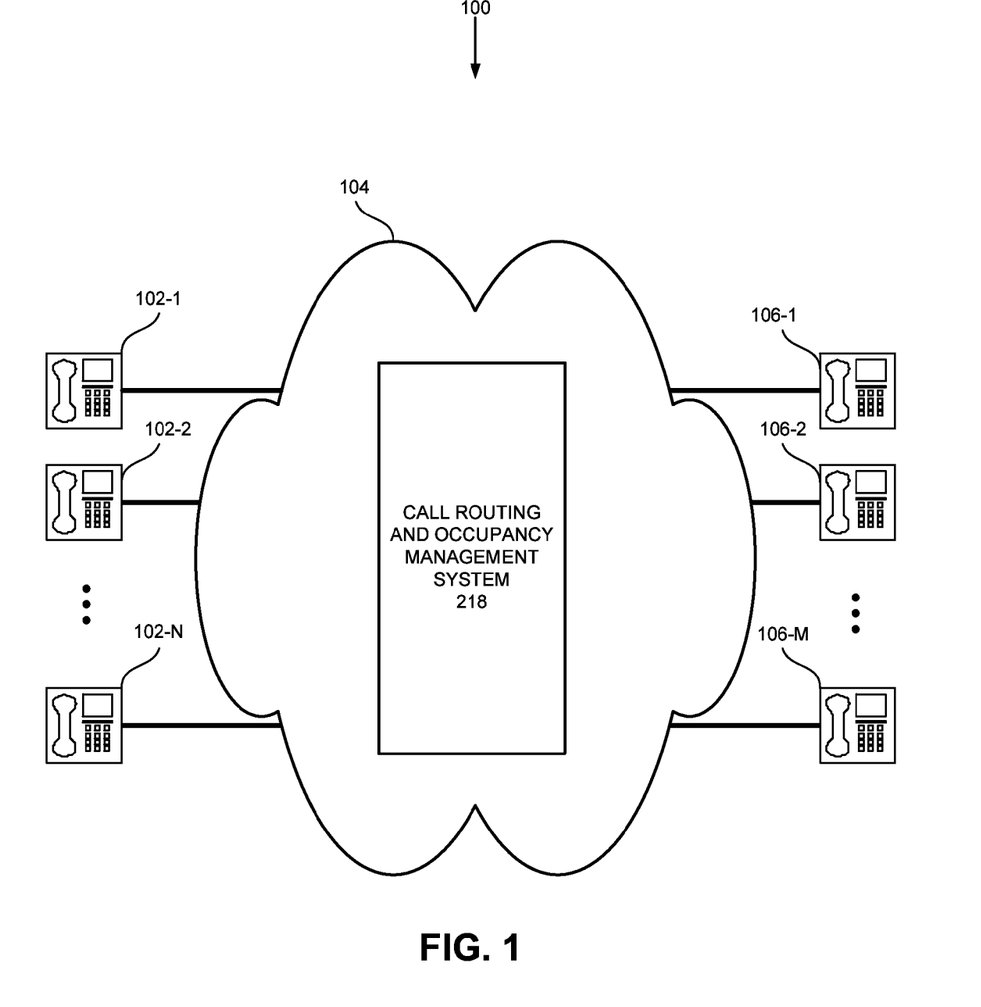
FIG. 1 illustrates a call routing environment.

FIG. 1 illustrates a call routing environment 100. As shown, a call routing environment 100 may include caller devices 102-1 through 102-N (referred to individually as "caller device 102" or collectively "caller devices 102"), a network 104 which includes call routing and occupancy management system 218 (also referred to as "call routing system 218"), and contact agent devices 106-1 through 106-M (individually "contact agent device 106" or collectively "contact agent devices 106"). Although caller devices 102 and contact agent devices 106 are illustrated as telephones, devices 102 and 106 may include, for example, soft phones (e.g., an IP phone application installed on a computer), smart phones, computers, laptops, workstations, etc.

Caller device 102 may call a contact center that includes call routing system 218. Caller device 102 may call the contact center to receive customer service, access information, purchase a product or a service, etc. Calls from caller device 102 may include a Session Initiation Protocol (SIP) calls, H.323 calls, etc. These calls may provide for different types of communications, such as telephone calls (plain old telephones system (POTS) calls), videoconference calls, videophone calls, text messaging sessions, VoIP calls, etc. The calls may have patterns, with respect to specific contact agent.

Network 104 may include one or more public switched telephone networks (PSTNs) or another type of switched network (e.g., an optical network). Network 104 may also include a number of transmission towers for receiving wireless signals and forwarding the signals toward the intended destination. Network 104 may further include one or more packet switched networks, such as an Internet protocol (IP) based network, a local area network (LAN), a wide area network (WAN), a personal area network (PAN), an intranet, the Internet, or another type of network (e.g., a satellite-based network) that is capable of exchanging information.

As further shown, network 104 may include call routing system 218. In some implementations, call routing system 218 may reside in a contact center or at a remote location connected to the contact center over an IP network. Call routing system 218 may receive calls, park calls, guide calls through menus, and/or route (e.g., forward) the calls to available contact agent devices 106. Contact agent device 106 may connect to caller device 102 via call routing system 218.

Call routing system 218 may identify agent groups with low call occupancy or projected low call occupancy. Call routing system 218 may select productive tasks for contact agents in the identified agent groups, and push the tasks to the agents. Furthermore, depending on the number of incoming calls, call routing system 218 may release agents from assigned tasks and have them handle calls.

Figure 2A:
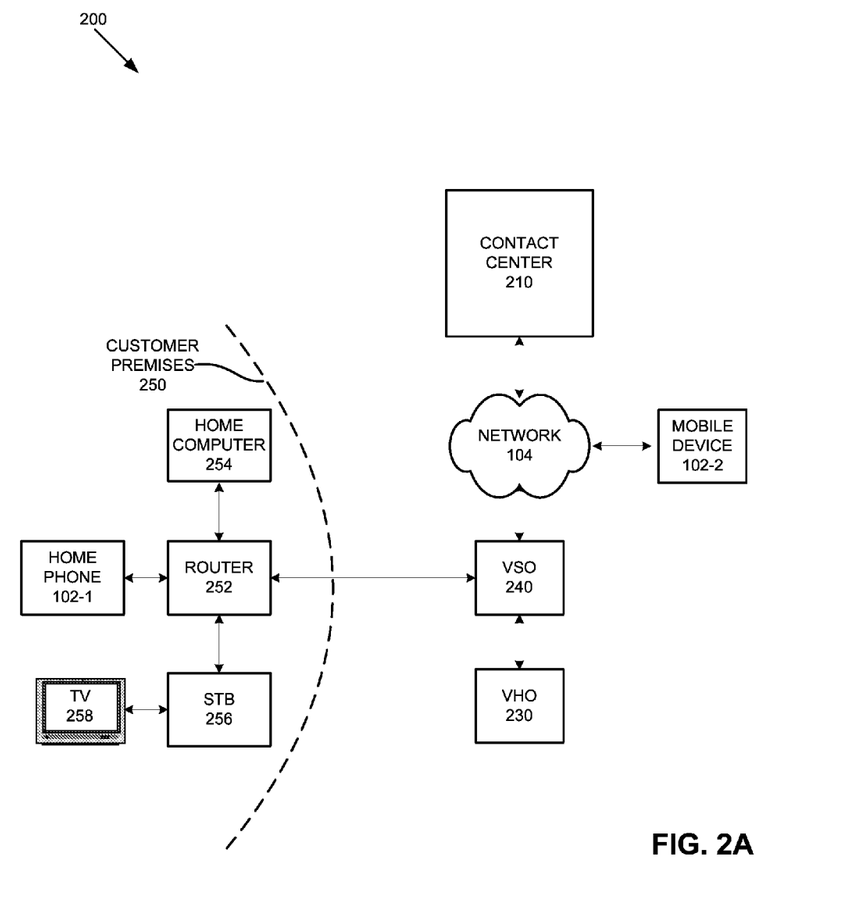
FIG. 2A is a diagram of an exemplary network in which the call routing system of FIG. 1 may be implemented.

FIG. 2A is a diagram of an exemplary network 200 in which call routing system 218 may be implemented. Network 200 may include a contact center 210, a video hub office (VHO) 230, a video service office (VSO) 240, customer premises 250, a network 104, and a mobile device 102-2. Customer premises 250 (e.g., the customer's home) may include a home router 252, a home computer 254, a set-top box (STB) 256, a TV 258, and a home phone 102-1. Devices in customer premises 250, such as home computer 254, home phone 102-1, STB 256, and TV 258 may each be considered a "user device" or "caller device."

Router 252 may receive data and may transfer the data to the appropriate device in customer premises 250, such as computer 254 or STB 256. Likewise, router 252 may receive data from any device in customer premises 250 and may transmit the data to other devices in network 200. Router 252 may provide customer premises 250 with Internet access, television access, or telephone service, for example.

Computer 254 may include a laptop, a desktop, a mobile telephone, a personal digital assistant (PDA), or another portable communication device. STB 256 may receive content and output the content to TV 258 for display. STB 256 may include a component (e.g., a cable card or a software application) that plugs into a host device (e.g., a personal computer, TV 258, a stereo system, etc.) that allows the host device to display content. TV 258 may include speakers as well as display. TV 258 may play content, for example, received from STB 256.

VSO 240 may deliver content to customer premises 250 and may receive data from customer premises 250 for forwarding to the proper destination (e.g., contact center 210). VSO 240 may include a content server for transcoding and multiplexing content from different sources for delivery to customer premises 250.

Mobile device 102-2 may include a radiotelephone, a personal communications system (PCS) terminal, a personal digital assistant (PDA), a laptop, or another portable communication device. Mobile device 102-2 may communicate with other devices via one or more communication towers (not shown) using a wireless communication protocol, e.g., GSM (Global System for Mobile Communications), CDMA (Code-Division Multiple Access), WCDMA (Wideband CDMA), IEEE 802.11x, etc. Mobile device 102-2 may be associated with a phone number. Like the devices in customer premises 250, mobile device 102-2 may also be considered a "user device" or "caller device."

Contact center 210 may include one or more devices that manage and/or store information associated with providing service to customers. Contact center 210 may receive calls (e.g., from home phone 102-1, mobile device 102-2, etc.), route the calls to agent groups or agents, assign tasks to contact agents, etc. Contact center 210 is further described below with reference to FIG. 2B.

VHO 230 may provide on-demand content or may serve and manage interactive content (e.g., a form of content with which a user can interact). Network 104 is described above with reference to FIG. 1. In FIG. 2A, network 104, in conjunction with components in VSO 240, may allow devices at customer premises 250 (e.g., a computer 254 or STB 256) to connect to other devices also attached to network 104, such as third party web site servers (not shown) or other customers (not shown).

Network 200 and devices in network 200 are illustrated for simplicity. Depending on the implementation, network 200 may include more devices, fewer devices, or a different configuration of devices than illustrated in FIG. 2A. For example, network 200 may include thousands or millions of customer premises. In some embodiments, the functions performed by two or more devices may be performed by any one device. Likewise, in some embodiments, the functions performed by any one device may be performed by multiple devices. Further, the connections shown in FIG. 2A are exemplary. In other embodiments, additional connections that are not shown in FIG. 2A may exist between devices (e.g., each device may be connected to every other device). The connections in FIG. 2A may also be wireless or wired.

Figure 2B:
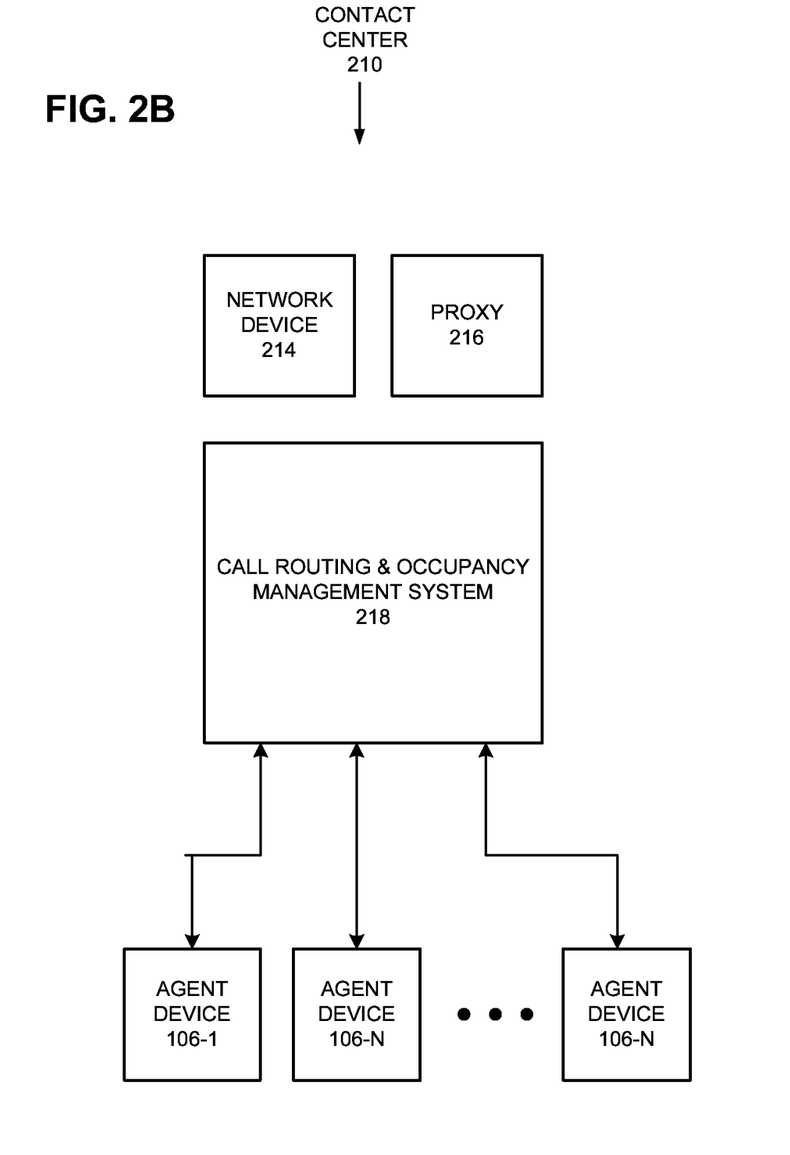
FIG. 2B is a diagram of exemplary devices of the exemplary contact center of FIG. 2A.

FIG. 2B is a diagram of exemplary devices of contact center 210. As shown, contact center 210 may include a network device 214, a proxy 216, call routing system 218, and contact agent devices 106-1 through 106-N. Depending on the implementation, contact center 210 may include additional, fewer, different, or a different arrangement of devices and components than those illustrated in FIG. 2B.

Network device 214 may include one or more devices that allow different data networks to communicate and cooperatively carry traffic. For example, network device 214 may adapt between SS7 signaling and session initiation protocol (SIP) signaling, H.323 protocol signaling, or other protocol signaling used by other devices in network 200. In one implementation, network device 214 may convert time division multiplexed (TDM) encoded voice signals to packetized data suitable for transport to and processing by a proxy device, such as proxy 216. Network device 214 may include a gateway that provides for compatibility at two levels, e.g., between different signaling schemes and between different media forms.

Network device 214 may also include one or more session border controllers (SBCs) that provide control of the boundary between different service provider networks, provide signaling protocol compatibility between an IP-based network and other service provider networks, and/or control the transport boundary between service provider networks. In one embodiment, network device 214 may correspond to an ingress point to proxy 216.

Proxy 216 may provide signaling services to establish sessions between devices, such as home phone 102-1 and a contact agent device 106. Proxy 216 may include a server or computer that is able to receive data from network device 214 and forward the received data to an appropriate device or system, such as call routing system 218 using a session signaling protocol, such as SIP or H.323. Proxy 216 may also receive data from call routing system 218 and forward the received data to other devices, such as network device 214, for example.

Call routing system 218 may distribute calls to one of contact agent devices 106. Call routing system 218 is illustrated as external from proxy 216. In some implementations, call routing system 218 may include proxy 216. Call routing system 218 may forward calls to one of contact agent devices 106 according to an algorithm. The algorithm may be based on which of contact agent devices 106 has an available customer service agent, the type of issue or problem the customer is experiencing, the skill set of the customer service agent, the experience of the customer service agent, the type of call, the type of customer, etc.

In addition, as already described above, call routing system 218 may identify agent groups with a low call occupancy or a projected low call occupancy. Call routing system 218 may select productive tasks for contact agents in the identified agent groups, and push the tasks to the agents. Furthermore, depending on the number of incoming calls, call routing system 218 may release agents from assigned tasks and have them handle calls.

Agent device 106 may include a workstation, computer, or another type of device for a customer service agent to use for handling calls from customers. Agent device 106 may include a telephone, a camera, a microphone, a speaker, and/or a headset including a microphone and speaker. Agent device 106 may also include a software-implemented telephone (e.g., a "soft" phone) or a hardware implemented telephone (e.g., a "hard" phone). Agent device 106 may also include software or hardware for performing packet-based data transmission to transmit data such as voice, video, and/or text. Although agent devices 106 are illustrated as part of contact center 210, depending on the implementation, agent devices may be distributed over different geographical locations.

Figure 3:
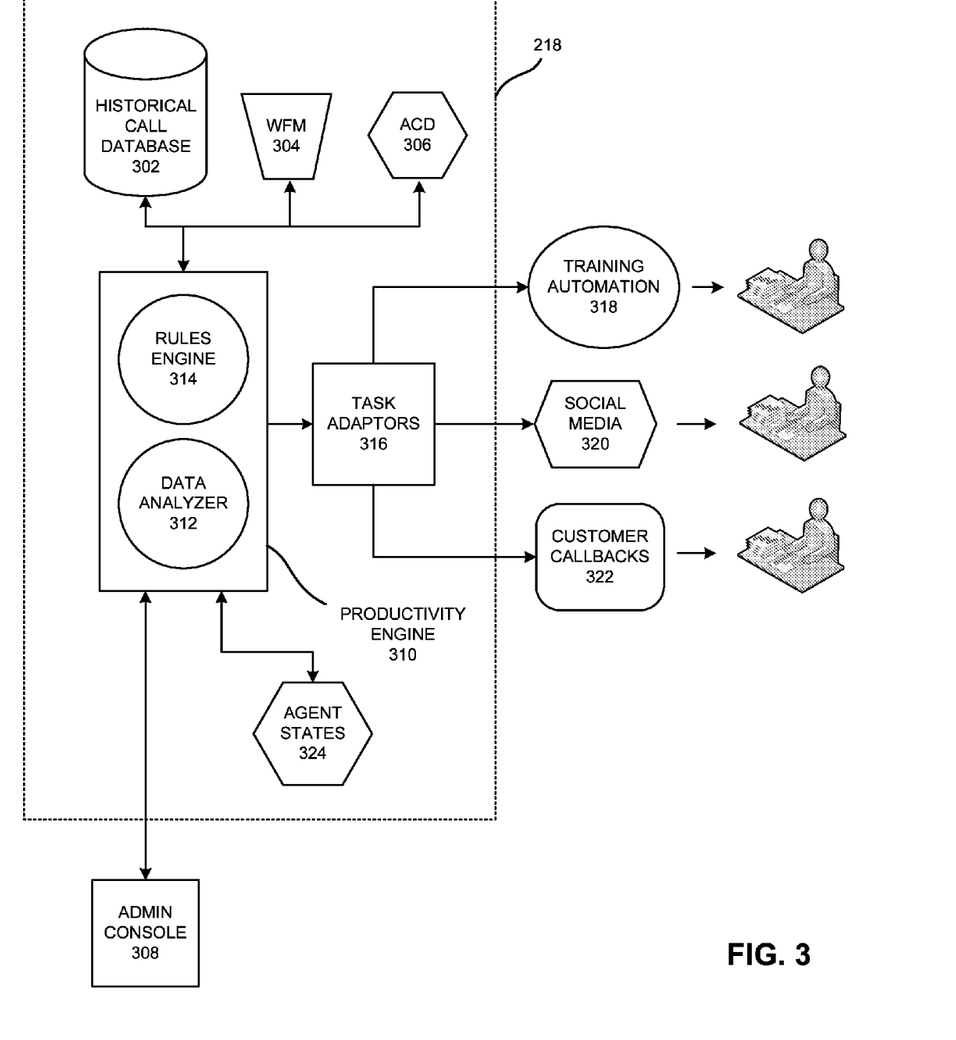
FIG. 3 is a diagram of exemplary components of the call routing system of FIG. 2B.

FIG. 3 is a diagram of exemplary functional components or devices of call routing system 218 and a portion of network 200. As shown, call routing system 218 and the portion of network 200 may include a historical call database 302, a work force management (WFM) application 304, an automatic call distributor (ACD) 306, an administration console 308, a productivity engine 310 that includes a data analyzer 312 and a rules engines 314, task adaptors 316, and agent states database 324. FIG. 3 also shows types of tasks, such as training automation 318, social media communication 320, and customer callbacks 322. Depending on the implementation, call routing system 218 and the portion of network 200 may include additional, fewer, different, or a different arrangement of components than those illustrated in FIG. 3.

Historical call database 302 may include historical call statistics. The data may include past call arrival rates, call distribution patterns, average call handling times, average response times, call volumes for each of agent groups, etc. Historical call database 302 may send historical call statistics to productivity engine 310.

Work force management application 304 may provide agent schedules (e.g., a table of agent schedules) to productivity engine 310. Each schedule may include agent identifiers, daily working hours, agent vacation times, etc. In one implementation, each schedule may be implemented as a record, as described below with reference to FIG. 4.

Automatic call distributor 306 may include an IP automatic call distributor and/or an automatic call distributor for POTS calls. Automatic call distributor 306 may provide real time feeds and events that describe current call conditions, such as the number of calls waiting in different queues (e.g., each queue for each agent group), waiting times of the oldest call waiting in queues, the number of agents logged in for a queue, etc.

Administration console 308 may receive business rules for controlling the behavior of productivity engine 310. Examples of rules may include: a rule for assigning a certain number of contact agents in an agent group to a set of tasks when a call occupancy of the group falls below a threshold; a rule for messaging agents to bring them back online and return to answering calls when a call volume for an agent group reaches a threshold; a rule for assigning an agent to a specific type of task based on the agent's skill set, background (e.g., how much training the agent had) and how many other agents are assigned to provide callbacks (e.g., return calls) to customers. Administration console 308 may provide the business rules to productivity engine 310.

Data analyzer 312 may obtain call statistics from historical call database 302, agent schedules from work force management application 304, and/or real time feeds and events from automatic call distributor 306. Based on the call statistics, agent schedules, and real time feeds, data analyzer 312 may evaluate call occupancy for each of agent groups, the standard deviation of the occupancy, and/or other parameters that rules engine 314 may need, to apply the rules received from administration console 308. For example, in one implementation, data analyzer 312 may generate a table of call occupancy records, in which each record shows call occupancy levels for an agent group at different times. Such a record is described below with reference to FIG. 4.

Rules engine 314 may apply business rules based on call occupancies for agent groups, the number of waiting calls for each agent group (e.g., each agent group that corresponds to a call queue), oldest call waiting, etc. Based on the rules, for each agent group, rules engine 314 may select a number of agents that may be taken offline (e.g., when the call occupancy for the queue is below a threshold), or, identify offline agents that should be brought back online to handle the current call volume (e.g., when the call occupancy is above a threshold).

After rules engine 314 selects a number of agents, in an agent group, that are to be offline, rules engine 314 may take into consideration occupancy information associated with the agent group (including the time when the low occupancy is to occur), information associated with the oldest call waiting in queue, and the standard deviation of the occupancy (or a second moment of the distribution), the rate of incoming calls, the current state of the selected agents with regard to online training, skill levels, etc., to determine what task is to be assigned to each of the selected agents. A task may include, for example, taking an online training course, returning customer calls, training other agents, etc.

Similarly, in selecting a number of agents, in an agent group, that are to be brought back from offline tasks, rules engine 314 may take into consideration occupancy information associated with the agent group (including the time when the occupancy is to increase above a threshold), information associated with the oldest call waiting in queue, and the standard deviation of the occupancy, the rate of incoming calls, the current state of the selected agents with regard to online training, skill levels, etc.

Once rules engine 314 determines which agents are to be taken offline or brought back from offline tasks, rules engine 314 may provide the identities of the agents and information related to the agents and tasks (e.g., whether the agent is to be assigned to the task or is to be brought back online, agent state information, etc.) to task adaptors 316. Thereafter, based on feedback from task adaptors 316, rules engine 314 may update agent states database 324 (e.g., records in the agent states database).

Task adaptors 316 may receive identities of agents, identities of tasks that the agents are to be assigned to or taken off from, and additional information related to the agents/tasks. For each task and agent, task adaptors 316 may dispatch appropriate set of processes that are specific to the task. For example, task adaptor 316 may launch processes for training/ automation 318, such as processes for communicating with an agent (e.g., a process for sending notifications about a course, availability of a course, etc.) and for tracking which training course the agent completed. In another example, task adaptor 316 may launch processes for providing information to agents via social media 320. In yet another example, task adaptor 316 may launch processes for assigning customer callback tasks 322 to agents.

Agents states database 324 may include, for each of agents, the current status of the agent. For example, agent states database 324 may indicate that an agent is engaged in a customer callback, is taking an online course, or engaged in another activity (e.g., solving a problem for a customer via social media). In some implementations, agent states database 324 may also include other information, such as an agent's area of expertise, skill level, whether the agent is currently online, etc.

Figure 4:
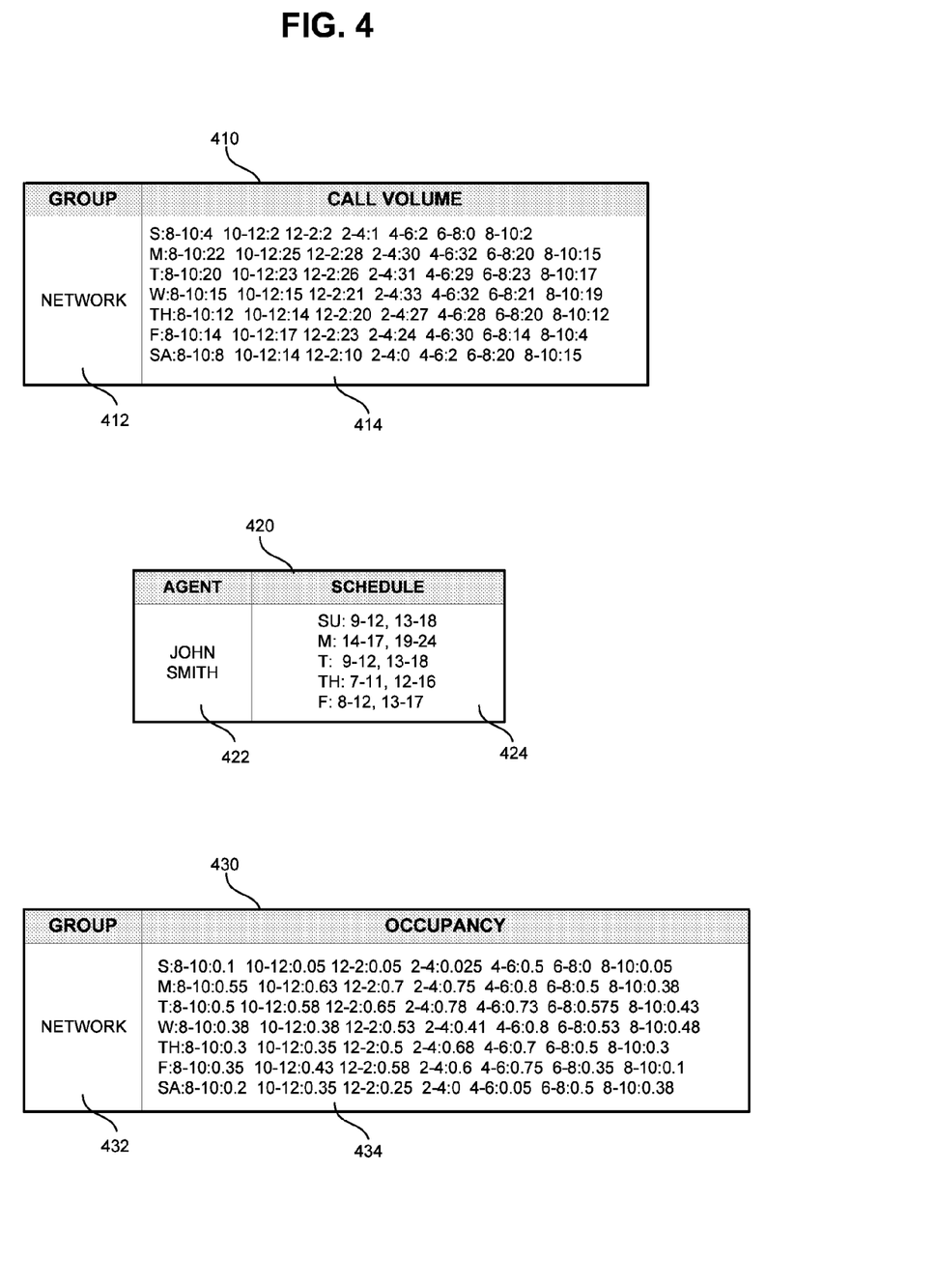
FIG. 4 is a diagram of exemplary tables provided by the historical call database, the work force management application, and the data analyzer of FIG. 3.

FIG. 4 is a diagram of exemplary tables provided by historical call database 302, work force management application 304, and data analyzer 312. Historical call database 302 may include, among other things, call volume records, one of which is illustrated as call volume record 410. Work force management application 304 may provide a table that includes agent schedules, one of which is shown as schedule record 420. Data analyzer 312 may provide a table that includes call occupancy records, one of which is shown as call occupancy record 430.

As shown, call volume record 410 includes a group field 412 and call volume field 414. Group field 412 may include information that identifies a specific group to which the call volume record 410 pertains, such as for example, network group. Call volume field 410 may indicate the average number of calls in different time intervals throughout a week, month, etc. For example, as shown in FIG. 4, call volume record 410 includes "M:8-10:22" entry, which indicates that on Monday, between 8 and 10 a.m., the network agent group received 22 calls.

Schedule record 420 may include an agent field 422 and schedule field 424. Agent field 422 may include alphanumeric characters or a string that identifies an agent (e.g., agent name, agent ID, etc.), agent's group, etc. Schedule field 424 may show the weekly schedule of an agent. For example, as shown in FIG. 4, schedule field 424 shows "M:14-17, 19-24," which indicates that the agent John Smith is scheduled to be online on Monday, between 2 and 5:00 p.m. and between 7 and 12:00 midnight. Depending on the implementation, schedule field 424 may include other types of schedule, such as monthly schedule.

Call occupancy record 430 may include an agent group identifier field 432 and occupancy field 434. Agent group identifier field 432 may identify the agent group to which call occupancy record 430 pertains. Occupancy field 434 may indicate average historical call occupancy levels for different time periods. For example, assume that the number of agents in the network agent group is 40. In FIG. 4, occupancy field 434 shows "M:8-10:0.55," indicating that between 8:00 a.m. and 10:00 a.m. on Monday, the occupancy level is 55%, indicating that 55% of (i.e., 22 agents) are online.

The call occupancy levels, for call occupancy record 430 in FIG. 4, are based on the assumption that 40 agents belong to the network agent group. For other agent groups, the call occupancy levels may be determined based on a different number of agents. In some implementations, the number of available agents for an agent group may vary throughout a week, and, consequently, even for a single agent group, the occupancy levels for the same number of calls at two different times may be different.

Figure 5:
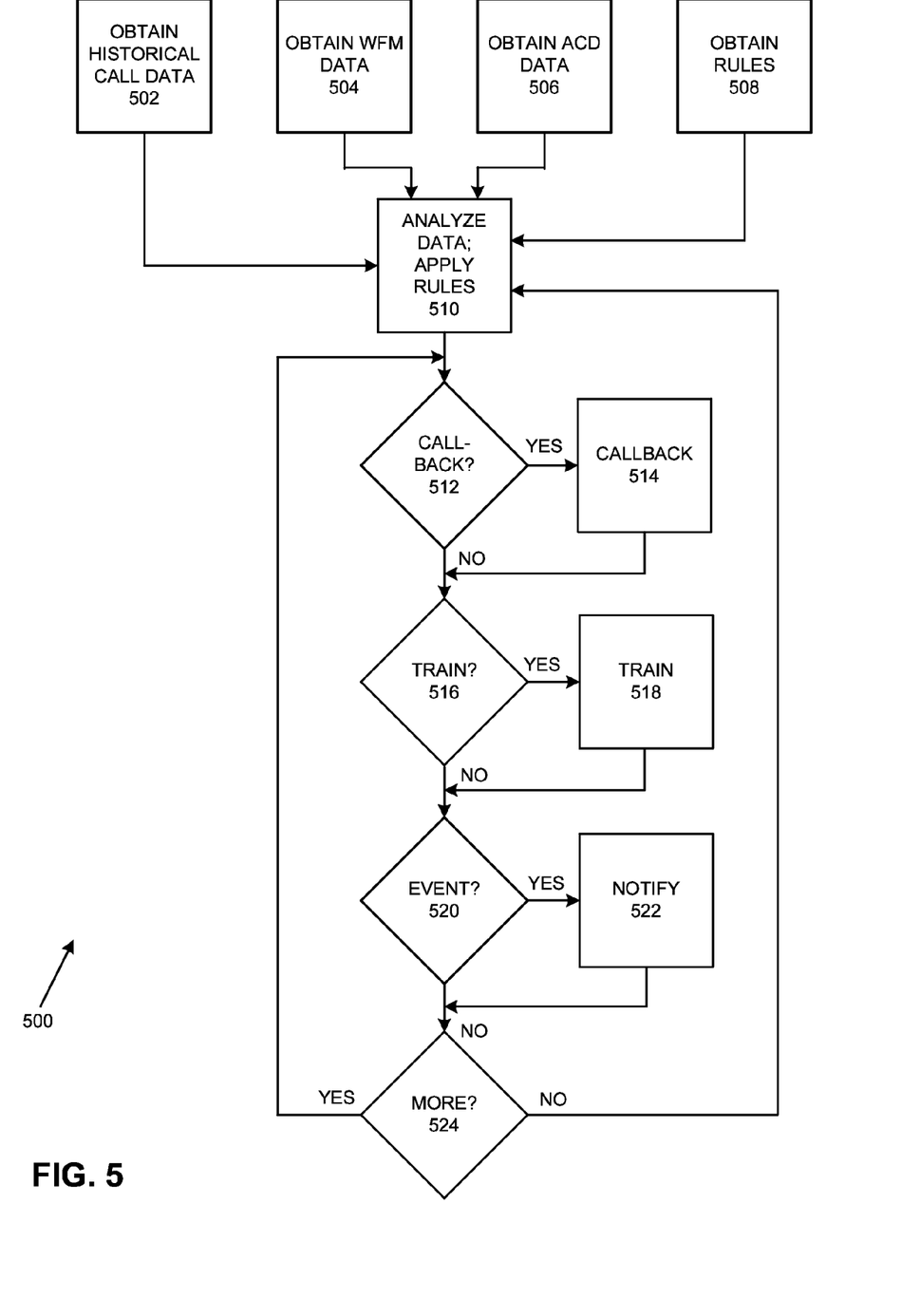
FIG. 5 is a flow diagram of an exemplary process that is associated with management of call occupancy.

FIG. 5 is a flow diagram of an exemplary process 500 that is associated with management of call occupancy for each agent group. In some implementations, process 500 may be performed by call routing and call occupancy management system 218 (e.g., historical call database 302, work force management application 304, automatic call distributor 306, productivity engine 310, task adaptors 316, etc.).

As shown, process 500 may include productivity engine 310 obtaining historical call data from historical call database 302 (block 502). In some implementations, the historical call data may include a table of call volume records, one of which is illustrated as record 410, in addition to other types of historical data.

Process 500 may also include productivity engine 310 obtaining data from work force management application 304 (block 504). As described above, the data may include agent schedules (e.g., record 420).

Productivity engine 310 may obtain data from automatic call distributor 306 (block 506). As described above, the data may include real time feeds and/or events that describe call conditions, such as the number of calls waiting in different queues, the number of calls currently being handled by agents, oldest call waiting times, the number of agents logged in at a queue, etc.

Productivity engine 310 may obtain business rules, for example, from administration console 308 (block 508). The business rules may specify: rules for assigning agents to tasks based on call occupancy levels; rules for bringing agents from offline tasks (e.g., tasks unrelated to handling calls) to online status; etc.

Productivity engine 310 may analyze the data received from historical call database 302, work force management application 304, and automatic call distributor 306 (block 510). The data may be used, for example, to project future call volumes and call occupancy records. Depending on the implementation, productivity engine 310 may obtain other parameters (e.g., call occupancy trends, call occupancy standard deviations, etc.) that productivity engine 310 may use to assign tasks to agents or to bring agents back to online status from their assigned tasks.

Productivity engine 310 may apply the business rules (block 510). As a result of applying the rules, productivity engine 310 may select agents that may be taken offline, may assign tasks to the agents, and/or may select offline agents to bring them back online.

Given a selected set of agents, at block 512, productivity engine 310 may determine whether the task for an agent is a customer callback task (block 512). If so (block 512: yes), productivity engine 310 may provide the identity of the selected agent, the identity of the task, and/or other information to the callback task adaptor. The callback task adaptor may perform actions that are necessary to have the agent working on the callback task (e.g., provide information relevant to the task to the agent (e.g., phone number, the nature of the call back, etc.), and/or monitor the agent's callback activity) (block 514). Process 500 may then proceed to block 516. Returning to block 512, if the task is not a customer callback task (block 512: no), process 500 may proceed to block 516.

Productivity engine 310 may determine whether the task for an agent is training (block 516). If so (block 516: yes), productivity engine 310 may provide the identity of the selected agent, the identity of the task, and or other information to the training task adaptor. The training task adaptor may perform actions that are associated with training the agent (block 518), such as informing the agent of an online course, providing a link to the online training, providing the online training, monitoring the agent's coursework, etc. Thereafter, process 500 may proceed to block 520. Returning to block 516, if the task is not a training task (block 516: no), process 500 may proceed to block 520.

Productivity engine 310 may determine whether task associated with the agent is to be notified of an event (e.g., be on a standby mode for potential call traffic) (block 520). If so (block 520: yes), productivity engine 310 may provide the identity of the selected agent, the identity of the task, and or other information to the notification adaptor. The notification adaptor may notify the agent about the event (block 522). Thereafter, process 500 may proceed to block 524. Returning to block 520, if the task is not notification (block 520: no), process 500 may proceed to block 524.

Productivity engine 310 may determine whether there are additional agents to which tasks may be assigned (block 524). If so (block 524: yes), process 500 may return to block 512. Otherwise (block 524: no), process may return to block 510.

Depending on the implementation, process 500 may include additional, fewer, or different blocks than those illustrated in FIG. 5. For example, in a different implementation, process 500 may include productivity engine 310 bringing back one or more agents to answer calls from a training task or a callback task based on a projected level of call occupancy. In another example, in some implementations, process 500 may include productivity engine 310 reassigning one or more agents, who have a skill set to handle calls at another queue, to the other queue whose call volume requires additional agents.

Figure 6:
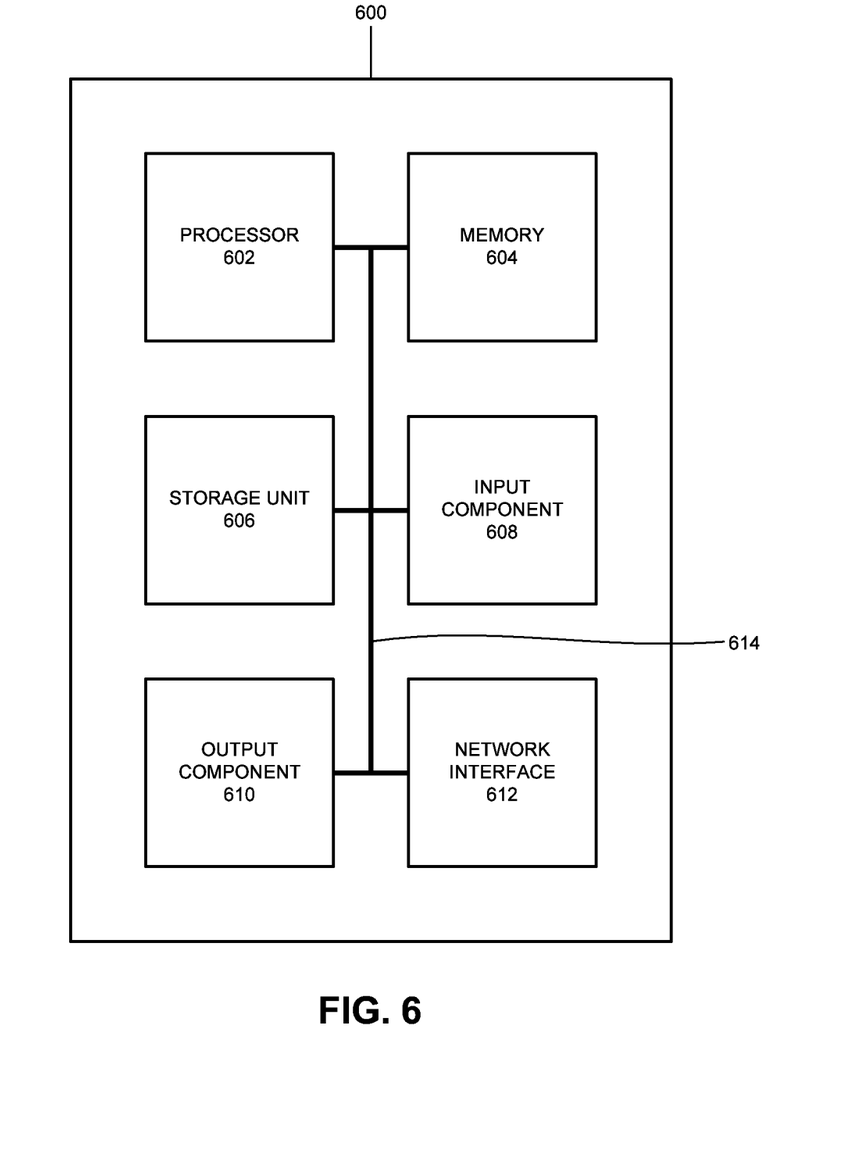
FIG. 6 is a block diagram of exemplary components of a network device of FIGS. 1 through 3.

FIG. 6 is a block diagram of an exemplary network device 600, which may correspond to one or more of devices of FIGS. 1 through 3. As shown, network device 600 may include a processor 602, memory 604, storage unit 606, input component 608, output component 610, network interface 612, and communication path 614. In different implementations, network device 600 may include additional, fewer, different, or different arrangement of components than the ones illustrated in FIG. 6. For example, network device 600 may include line cards for connecting to external buses.

Processor 602 may include a processor, a microprocessor, an Application Specific Integrated Circuit (ASIC), a Field Programmable Gate Array (FPGA), and/or other processing logic (e.g., embedded devices) capable of controlling network device 600. Memory 604 may include static memory, such as read only memory (ROM), and/or dynamic memory, such as random access memory (RAM), or onboard cache, for storing data and machine-readable instructions (e.g., programs, scripts, etc.). Storage unit 606 may include a floppy disk, CD ROM, CD read/write (R/W) disc, and/or flash memory, as well as other types of storage devices (e.g., hard disk drive) for storing data and/or machine-readable instructions (e.g., a program, script, etc.).

Input component 608 and output component 610 may provide input and output from/to a user to/from network device 600. Input/output components 608 and 610 may include a display screen, a keyboard, a mouse, a speaker, a microphone, a camera, a DVD reader, Universal Serial Bus (USB) lines, and/or other types of components for converting physical events or phenomena to and/or from signals that pertain to network device 600.

Network interface 612 may include a transceiver (e.g., a transmitter and a receiver) for device 600 to communicate with other devices and/or systems. For example, via network interface 612, network device 600 may communicate over a network, such as the Internet, an intranet, a terrestrial wireless network (e.g., a WLAN, WiFi, WiMax, etc.), a satellite-based network, optical network, etc. Network interface 612 may include a modem, an Ethernet interface to a LAN, and/or an interface/connection for connecting network device 600 to other devices (e.g., a Bluetooth interface).

Communication path 614 may provide an interface through which components of network device 600 can communicate with one another.

Network device 200 may perform the operations described herein in response to processor 602 executing software instructions stored in a non-transient computer-readable medium, such as memory 604 or storage unit 606. The software instructions may be read into memory 604 from another computer-readable medium or from another device via network interface 612. The software instructions stored in memory 604 or storage unit 606, when executed by processor 602, may cause processor 602 to perform processes that are described herein.

As described above in detail, call routing and occupancy management system 218 may apply business rules, which control the behavior of productivity engine 310, to information/data that productivity engine 310 receives from historical call database 302, work force management application 304, and/or automatic call distributor 306.

From historical call database 302, productivity engine 310 receives past call arrival rates, call distribution patterns, average call handling times, average response times, etc. From work force management application 304, productivity engine 310 receives agent schedules. From automatic call distributor 306, productivity engine 310 receives real time feeds and events that describe the current contact center conditions.

Based on the received information, productivity engine 310 identifies agent groups with low call occupancy or projected low call occupancy for productive tasks. Thereafter, the tasks are pushed to the agents via task adaptors 316 that handle the specifics of each task. Task adaptors 316 also monitor and control the completion of each task.

Because productivity engine 310 monitors incoming calls in real time, productivity engine 310 is capable of responding to sudden influx of calls, by releasing agents from training and notifying them to be online. This allows contact center 210 that includes call routing and occupancy management system 218 to respond to the customers in a timely manner, without affecting the contact center KPI.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with regard to an exemplary process illustrated in FIG. 5, the order of the blocks may be modified in other implementations. In addition, non-dependent blocks may represent acts that can be performed in parallel to other blocks. Furthermore, one or more of the blocks may be omitted in other implementations.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
receiving, at one or more processors and from a historical call database, a history of call volumes and statistics for a call queue;
receiving, at the one or more processors, from a work force management application, and for each of a plurality of agents that are associated with the call queue, a work schedule;
analyzing, by the one or more processors, the history of call volumes and statistics, for the call queue, received from the historical call database and the work schedules received from the work force management application;
determining, by the one or more processors, a projected call occupancy for the call queue based on analyzing the history of call volumes and statistics for the call queue and the work schedules;
selecting, by the one or more processors, a subset of agents, among the plurality of agents that are associated with the call queue, that are not needed to handle calls in the call queue during a time when the projected call occupancy is below a first threshold; and
assigning, by the one or more processors, tasks, for the time, to the subset of agents.

2. The method of claim 1, wherein the tasks include:
taking an online training course, or
making return calls to customers.

3. The method of claim 1, further comprising:
receiving one or more business rules,
wherein selecting the subset of agents includes applying the one or more business rules to the projected call occupancy.

4. The method of claim 1, further comprising:
receiving one or more business rules;
wherein assigning the tasks to the subset of agents includes applying the one or more business rules to assign the tasks to the subset of agents.

5. The method of claim 1, further comprising:
monitoring the tasks.

6. The method of claim 5, further comprising:
storing information about states of the subset of agents in records in a database; and
updating the records based on the monitored tasks.

7. The method of claim 1, further comprising:
receiving real time feeds that describe current call conditions of the call queue.

8. The method of claim 7, wherein the real time feeds include:
information indicating a number of calls waiting in the call queue; or
information indicating a waiting time of an oldest call waiting in the call queue.

9. The method of claim 8, wherein selecting the subset of agents includes selecting the subset of agents based on at least one of:
the projected call occupancy, the statistics, the number of calls waiting in the call queue, or the waiting time of the oldest call waiting in the call queue.

10. The method of claim 7, further comprising:
bringing the subset of agents back from the tasks when the real time feeds indicate that a number of calls in the call queue is above a second threshold.

11. A device comprising:
a network interface to:
receive, from a historical call database, a history of call volumes and statistics for a call queue at an automatic call distributor;
receive, from a work force management application, for each of a plurality of agents that are associated with the call queue, a work schedule; and
a processor to:
analyze the history of call volumes for the call queue and the work schedules received from the historical call database and the work schedules received from the work force management application;
determine a projected call occupancy for the call queue based on analyzing the history of call volumes for the call queue and the work schedules;
select a subset of agents, among the plurality of agents that are associated with the call queue, that are not needed to handle calls in the call queue during a time period for which the projected call occupancy is below a first threshold; and
assign tasks, for the time period, to the subset of agents.

12. The device of claim 11, wherein when the processor assigns the tasks, the processor is configured to:
provide identities of the subset of agents and the tasks to task adaptors that launch processes for having the agents perform the tasks.

13. The device of claim 11, wherein the tasks include:
taking an online training course, or making callbacks to customers.

14. The device of claim 11, wherein the calls include:
a plain old telephone system (POTS) call;
a videoconferencing call;
a Session Initiation Protocol (SIP) call; or
a text messaging session call.

15. The device of claim 11, wherein the network interface is configured to:
receive one or more business rules, and
wherein when the processor selects the subset of agents, the processor is configured to:
apply the one or more business rules to the projected call occupancy.

16. The device of claim 11, wherein the network interface is configured to:
receive one or more business rules, and
wherein when the processor assigns the tasks to the subset of agents, the processor is configured to:
apply the one or more business rules to assign the tasks to the subset of agents.

17. The device of claim 11, wherein the network interface is further configured to:
receive, from the automatic call distributor, real time feeds that identify current call conditions of the call queue.

18. The device of claim 17, wherein the real time feeds include:
information indicating a number of calls waiting in the call queue; or information indicating waiting time of an oldest call waiting in the call queue.

19. The device of claim 18, wherein when the processor selects the subset of agents, the processor is configured to select the subset of agents based on at least one of:
the projected call occupancy, the statistics, the number of calls waiting in the call queue, or the waiting time of the oldest call waiting in the call queue.

20. A non-transitory computer readable medium comprising computer-executable instruction that, when executed by one or more processors, cause the one or more processors to:
receive a history of call volumes and statistics for a call queue from a historical call database;
receive, for each of a plurality of agents that are associated with the call queue, a work schedule from a work force management application;
analyze the history of call volumes for the call queue received from the historical call database and the work schedules received from the work force management application;
determine a projected call occupancy for the call queue based on analyzing the history of call volumes for the call queue and the work schedules;
select a subset of agents, among the plurality of agents that are associated with the call queue, that are not needed to handle calls in the call queue during a time period when the projected call occupancy is below a threshold; and
assign tasks, for the time period, to the subset of agents.

* * * * *